(12) United States Patent
Tokach et al.

(10) Patent No.: US 10,113,656 B2
(45) Date of Patent: Oct. 30, 2018

(54) TRACK TENSIONER

(71) Applicant: Clark Equipment Company, West Fargo, ND (US)

(72) Inventors: Thomas J. Tokach, Mandan, ND (US); Jason R. Coombs, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 15/143,049

(22) Filed: Apr. 29, 2016

(65) Prior Publication Data

US 2016/0318566 A1    Nov. 3, 2016

Related U.S. Application Data

(60) Provisional application No. 62/154,406, filed on Apr. 29, 2015.

(51) Int. Cl.
*B62D 55/30* (2006.01)
*F16K 15/04* (2006.01)
(Continued)

(52) U.S. Cl.
CPC .......... *F16K 15/044* (2013.01); *F15B 15/202* (2013.01); *F15B 15/261* (2013.01);
(Continued)

(58) Field of Classification Search
CPC .... F16K 15/044; F15B 15/361; F15B 15/202; F15B 2211/30505; F15B 2013/041; F15B 13/0406; F15B 13/027
(Continued)

(56) References Cited

U.S. PATENT DOCUMENTS 2,839,032 A    6/1958 Reynolds
3,605,808 A    9/1971 Fisher
(Continued)

FOREIGN PATENT DOCUMENTS

EP    0930227 A2    7/1999
EP    1647722 A1    4/2006
JP    2001032803 A    2/2001

OTHER PUBLICATIONS

Invitation to Pay Additional Fees dated Sep. 26, 2016 for International Application No. PCT/US2016/030217 filed Apr. 29, 2016, 8 pages.
(Continued)

*Primary Examiner* — S. Joseph Morano
*Assistant Examiner* — Jean W Charleston
(74) *Attorney, Agent, or Firm* — John D. Veldhuis-Kroeze; Westman, Champlin & Koehler, P.A.

(57) ABSTRACT

Valve assemblies are provided in a track tensioning system or in other applications. The valve assemblies allow pressurized fluid (grease or hydraulic fluid from a power machine) to be introduced or evacuated from the same port. The valve assemblies use either a single check ball or poppet configuration, or a dual check ball or poppet configuration which are moveable from a first configuration, in which fluid is blocked in one direction while allowing flow in the other direction, to a second configuration where the reverse is true. A track tensioning element includes piston retaining features which retain a piston within a track tensioning cylinder tube. A track tensioning element can also include a no-pre-load spring positioned in-line with the tensioning cylinder. Disclosed track tensioning systems and track tensioning elements can, in various embodiments, utilize any combination of all or some of the disclosed features.

17 Claims, 14 Drawing Sheets

(51) Int. Cl.
F15B 15/20 (2006.01)
F15B 15/26 (2006.01)
F15B 13/02 (2006.01)
F15B 13/04 (2006.01)

(52) U.S. Cl.
CPC ......... *F15B 13/027* (2013.01); *F15B 13/0406* (2013.01); *F15B 2013/041* (2013.01); *F15B 2211/30505* (2013.01)

(58) Field of Classification Search
USPC ................ 305/143, 146, 151, 152, 153, 154
See application file for complete search history.

(56) References Cited

U.S. PATENT DOCUMENTS

| | | |
|---|---|---|
| 3,645,586 A | 2/1972 | Piepho |
| 3,647,270 A | 3/1972 | Althaus |
| 4,314,592 A | 2/1982 | Silvey |
| 4,681,376 A | 7/1987 | Riml |
| 4,726,631 A | 2/1988 | Jones et al. |
| 5,851,058 A * | 12/1998 | Humbek ................ B62D 55/30 305/146 |
| 2009/0273233 A1* | 11/2009 | Tokach ................ B62D 55/305 305/146 |
| 2011/0255996 A1* | 10/2011 | Wickstead ............. F16K 15/04 417/53 |
| 2012/0062025 A1 | 3/2012 | Braun |
| 2014/0174575 A1* | 6/2014 | Fuller .................... F16K 15/04 137/625.42 |
| 2014/0369874 A1* | 12/2014 | Hines ..................... F16K 15/03 417/559 |

OTHER PUBLICATIONS

International Search Report and Written Opinion dated Dec. 20, 2016 for International Application No. PCT/US2016/030217 filed Apr. 29, 2016, 20 pages.

* cited by examiner

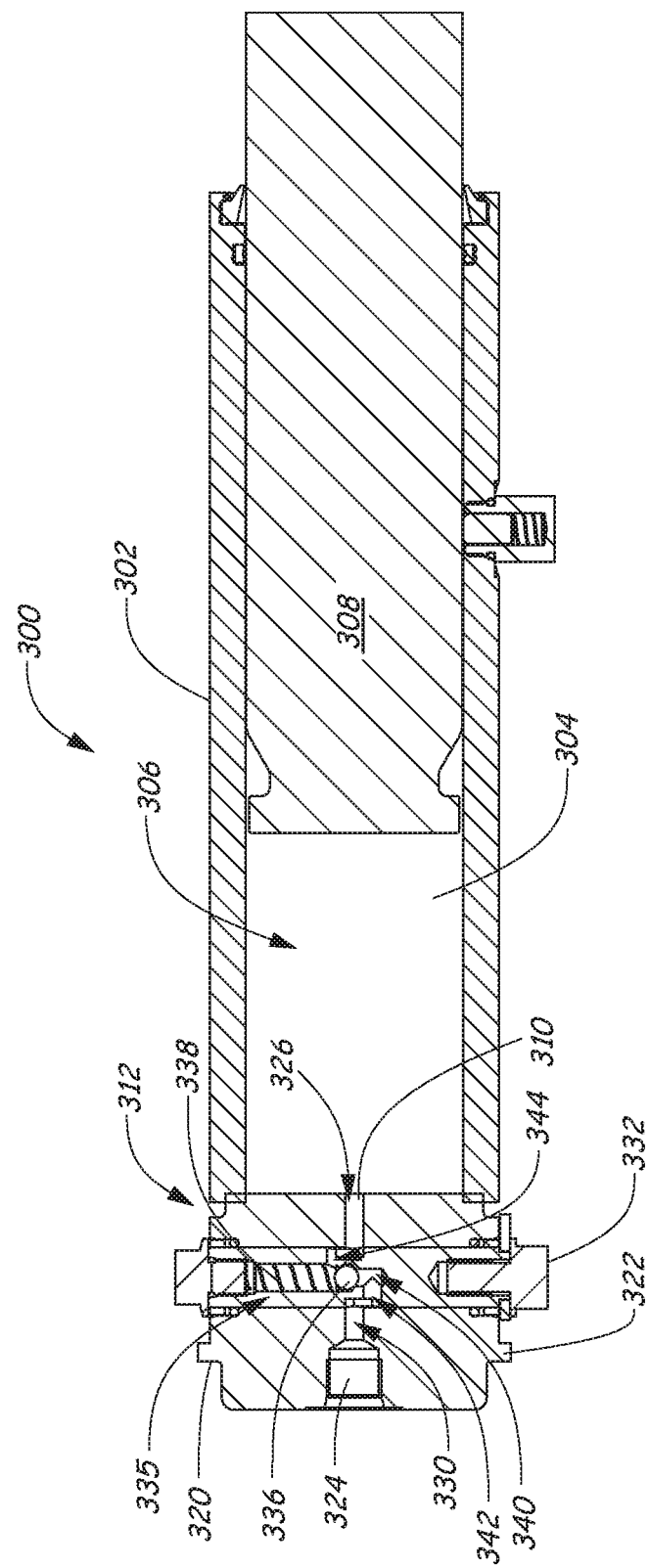

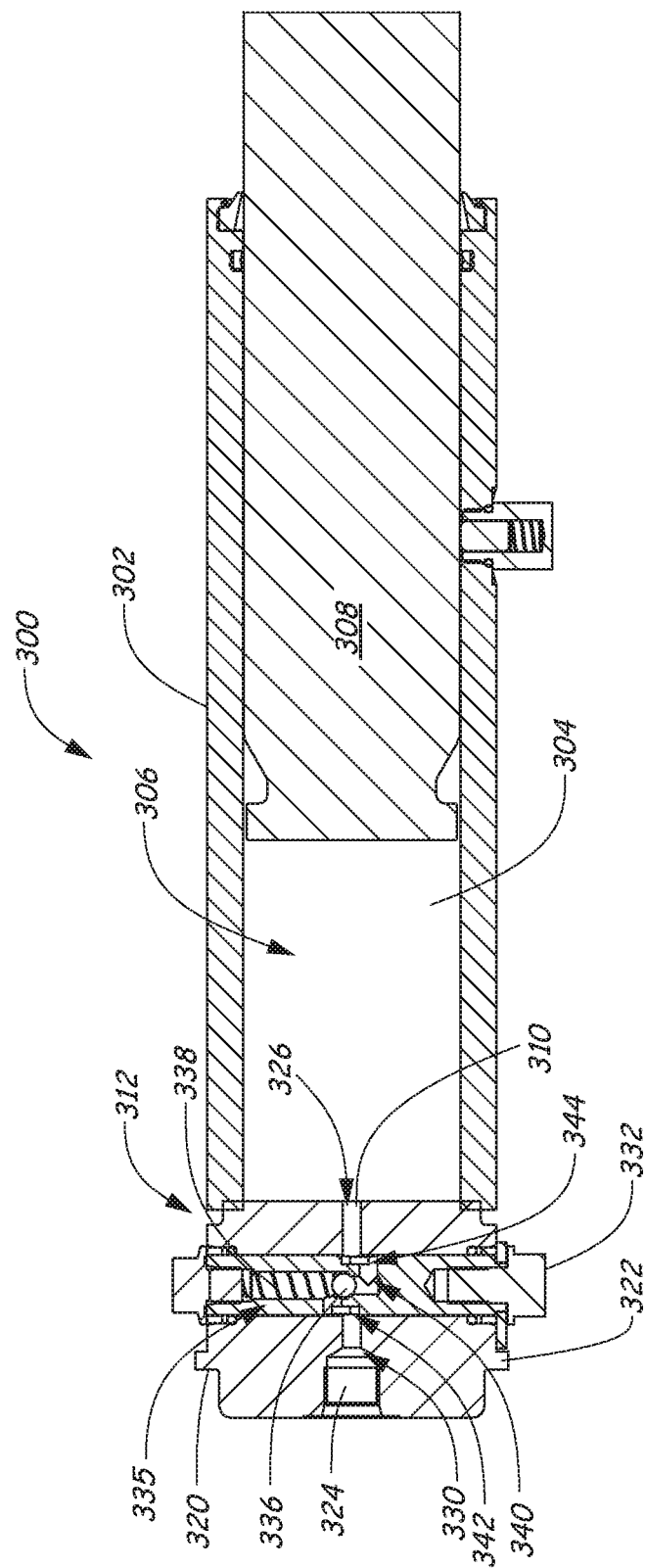

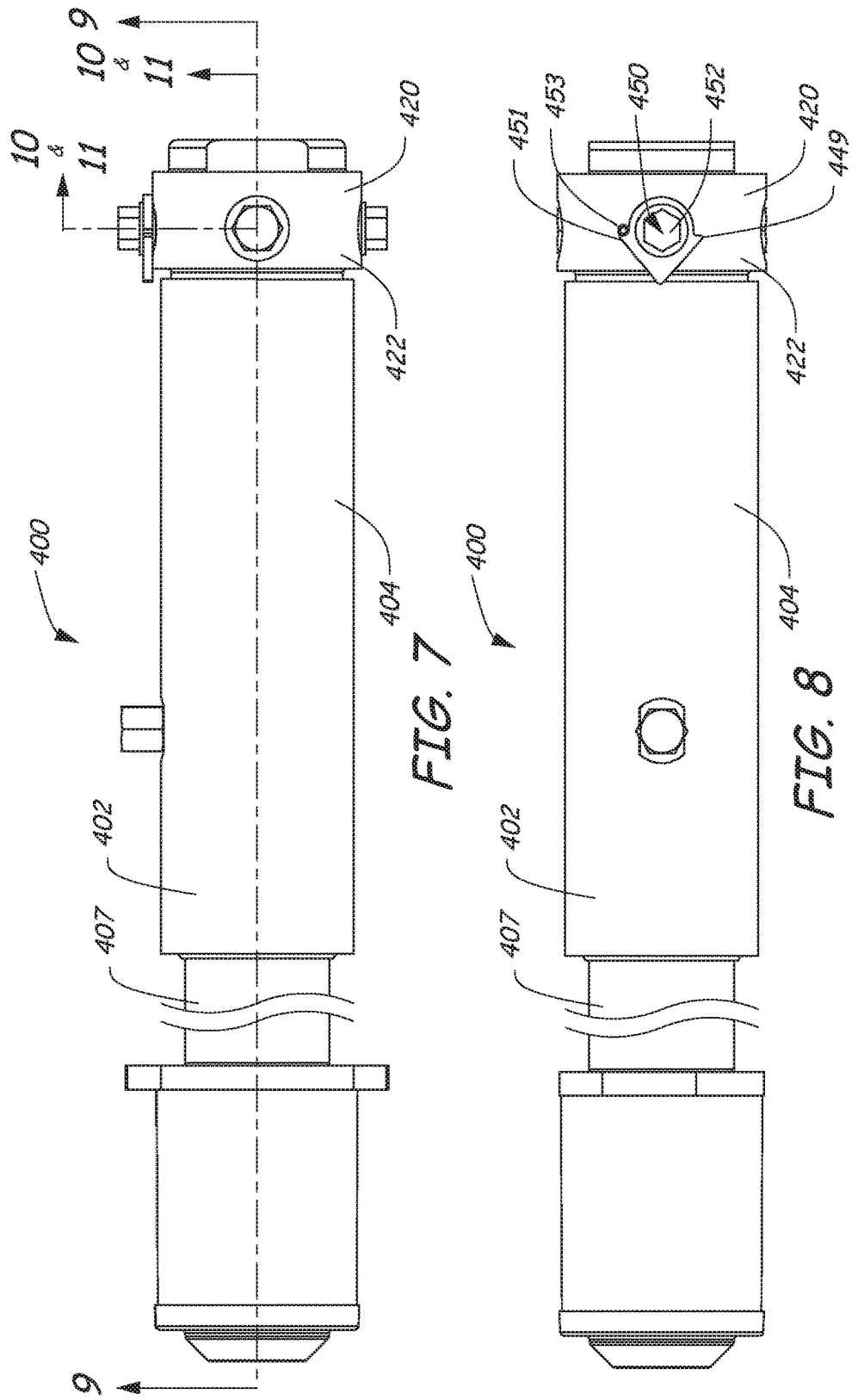

TRACK TENSIONER

CROSS-REFERENCE TO RELATED APPLICATION

This application claims the benefit of U.S. Provisional Application No. 61/154,406,62/154,406 filed Apr. 29, 2015.

BACKGROUND

The present disclosure is directed toward power machines. More particularly, the present disclosure is related to tensioning members that are capable of applying tension to endless tracks or tractive elements of a power machine.

Power machines, for the purposes of this disclosure, include any type of machine that generates power for the purpose of accomplishing a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Tractive elements are devices that engage a support surface such as the ground to cause the power machine to move over the support surface. Many power machines employ endless tracks as tractive elements. Some power machines that include endless tracks include track frames with various components mounted to them for the purpose of engaging the endless track and providing proper tensioning of the endless track. These components typically include idlers, rollers, or some combination of idlers and rollers.

For track tensioning, it is known to employ a grease cylinder to position an idler against the track to set the tension of the track. By introducing grease into or evacuating grease out of the cylinder, the tension can be set. A spring is positioned in-line with the cylinder to allow the idler to deflect a certain amount when hitting an obstacle or when foreign material (like, for example, a rock) is introduced between the idler and the track. This spring protects the track or track system from being damaged in such situations. However, pre-loading of springs in track tensioning systems sometimes renders the track tensioning system very difficult to service in the field.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

In some exemplary embodiments, a two-position, dual direction check valve is provided in a track tensioning system or in other applications. The two-position, dual direction check valve allows pressurized fluid (grease or hydraulic fluid from a power machine) to be introduced into or evacuated from the same port on a tensioning element. The mechanism, in some embodiments, uses a single check ball in a device that is moveable from a first position, in which fluid is blocked in one direction (so for example preventing the evacuation of fluid from the cylinder) while allowing flow in the other direction (to allow fluid to be introduced into the cylinder) to a second position where the reverse is true. In other embodiments, a two-position or configuration, dual check or poppet valve arrangement is provided in a valve assembly to allow pressurized fluid to be introduced or evacuated from the same port.

In some exemplary embodiments, a system is provided for introducing and evacuating fluid from a cavity through a single port. The system includes a valve assembly having a valve assembly body with an inlet providing the single port and an outlet. The outlet is positioned in fluid communication with an aperture into the cavity. A fluid path extends through the valve body between the inlet and the outlet. A valve element is positioned in the valve assembly body, and is configured to be moved between a first position and a second position. In the first position, pressurized fluid can be introduced from the inlet, through the fluid path and outlet, into the cavity. In the first position, pressurized fluid in the cavity is prevented from exiting through the outlet. In the second position of the valve element, pressurized fluid in the cavity can pass through the outlet and the fluid path and exit the inlet.

In some exemplary embodiments, a track tensioning element includes piston retaining features which retain a piston within a track tensioning cylinder tube.

In some exemplary embodiments, a track tensioning element includes a no-pre-load spring positioned in-line with the tensioning cylinder.

Track tensioning systems and track tensioning elements can, in various embodiments, utilize any combination of all or some of the disclosed features.

BRIEF DESCRIPTION OF THE DRAWINGS

FIGS. 5-6 illustrate cross sections of a portion of the tensioning element of FIG. 4 showing a valve assembly in first and second positions.

FIGS. 7-8 illustrate a tensioning element for use to tension a track on a power machine according to another illustrative embodiment.

FIGS. 14 and 15 illustrate a diagrammatic cross section of a tensioning element according to yet another illustrative embodiment.

DETAILED DESCRIPTION OF ILLUSTRATIVE EMBODIMENTS

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Unidirectional valves, such as check valves, are advantageously employed in certain applications, such as in track tensioning cylinders, to allow the travel of a pressurized fluid in one direction through the valve while blocking the flow of pressurized fluid in the opposite direction. In some applications, it can be advantageous to allow uni-directional flow in one direction under some conditions and allow uni-directional flow in the opposite direction under other conditions.

In accordance with some exemplary embodiments, the present disclosure provides for a valve assembly with a uni-directional valve member located therein that can be operated so that the uni-directional valve member can be used to selectively provide uni-directional flow in a first direction in one position and provide uni-directional flow in a second position, opposite of the first direction through the same check valve without changing the orientation of the a uni-directional valve member. In a first embodiment, the valve assembly includes a valve body that has an input and an output and is adapted for use with tensioning cylinders on track loaders. Track loaders often include tensioning elements in the form of cylinders that are capable of urging an idler operably coupled to the tensioning element against an endless track for maintaining a desired tension on the endless track. Introducing pressurized fluid into the tensioning cylinder will cause the tensioning cylinder and the operably coupled idler to apply pressure against the track. Relieving pressure in the tensioning cylinder will correspondingly reduce the pressure applied on the track and allow for easy removal of the track from a track frame when necessary.

Figure 2:
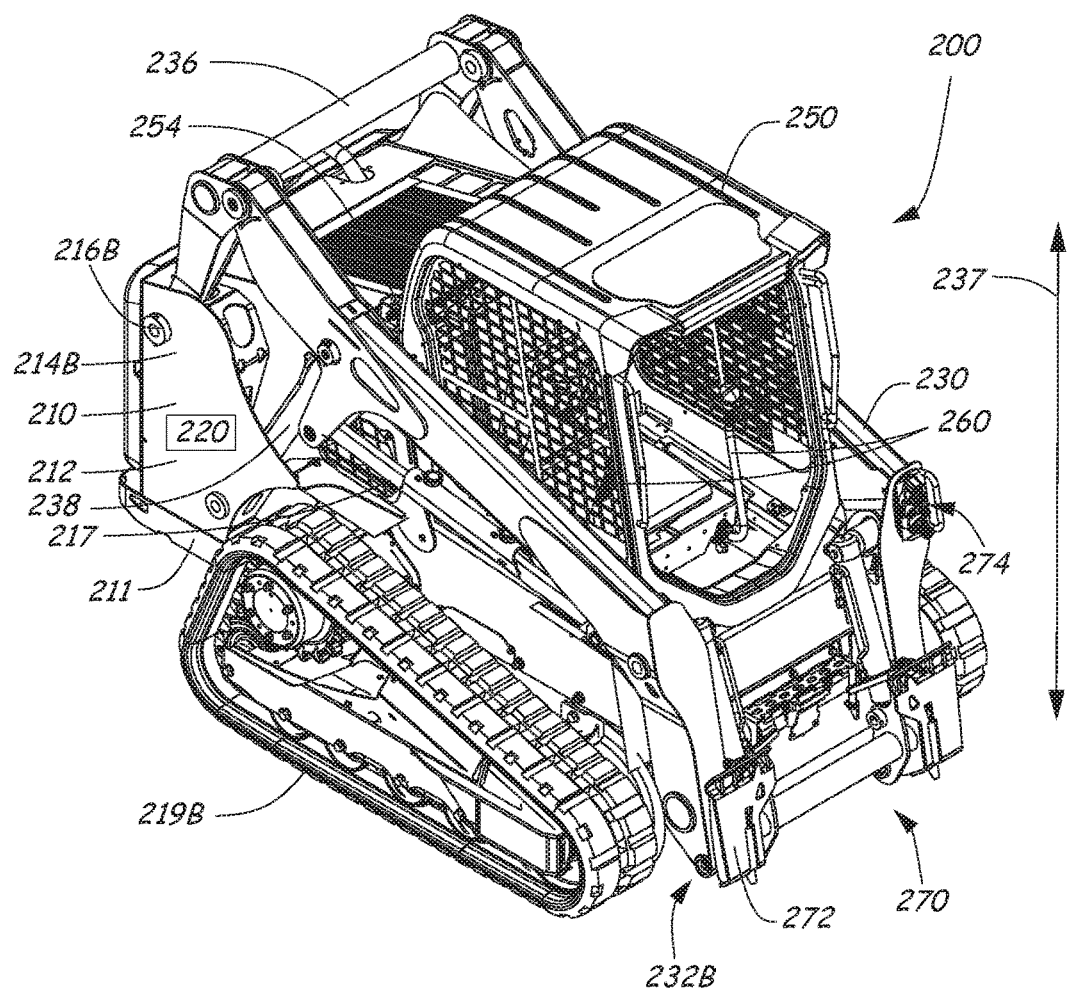
FIG. 2 is a front perspective view of a power machine on which embodiments disclosed herein can be advantageously practiced.
Figure 3:
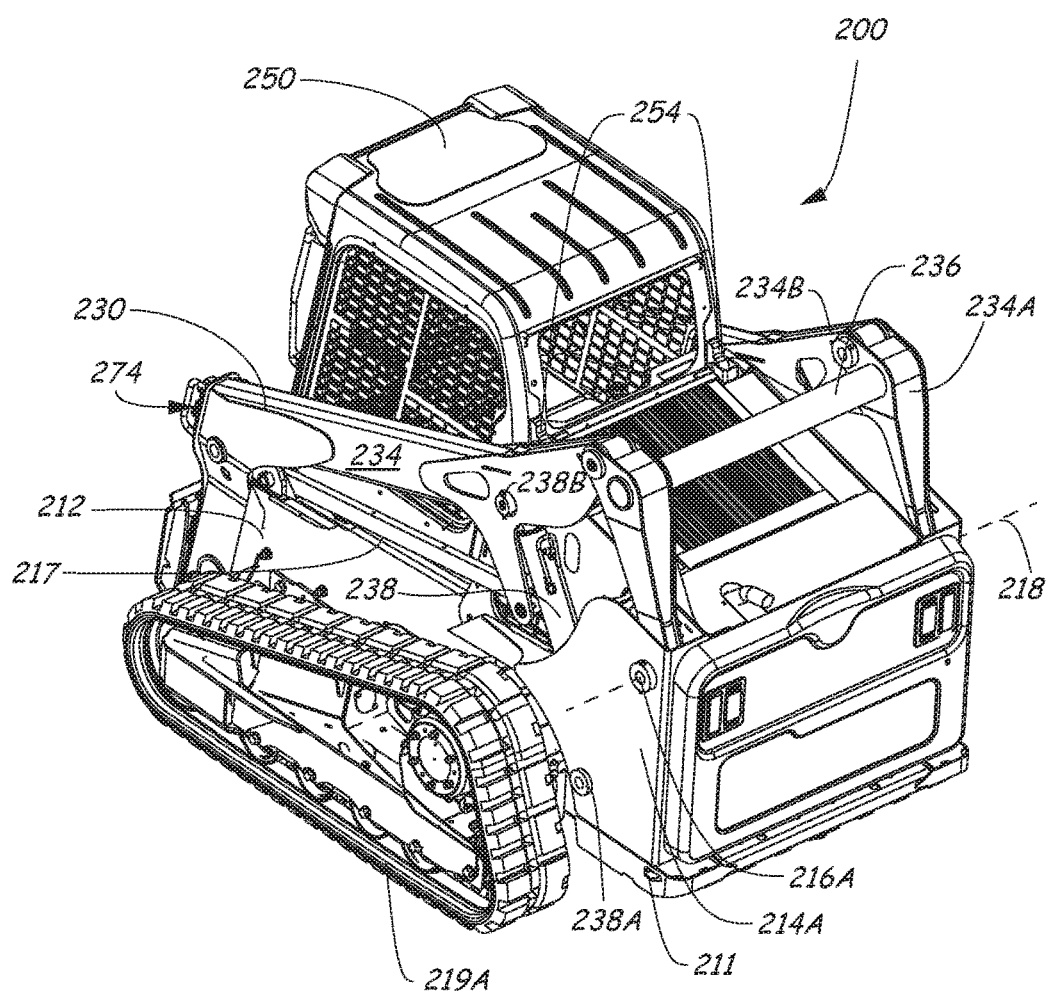
FIG. 3 is a rear perspective view of the power machine shown in FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is discussed. However, as mentioned above, the embodiments below can be practiced on any of a number of power machines, including power machines of different types from the representative power machine shown in FIGS. 2-2A. Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
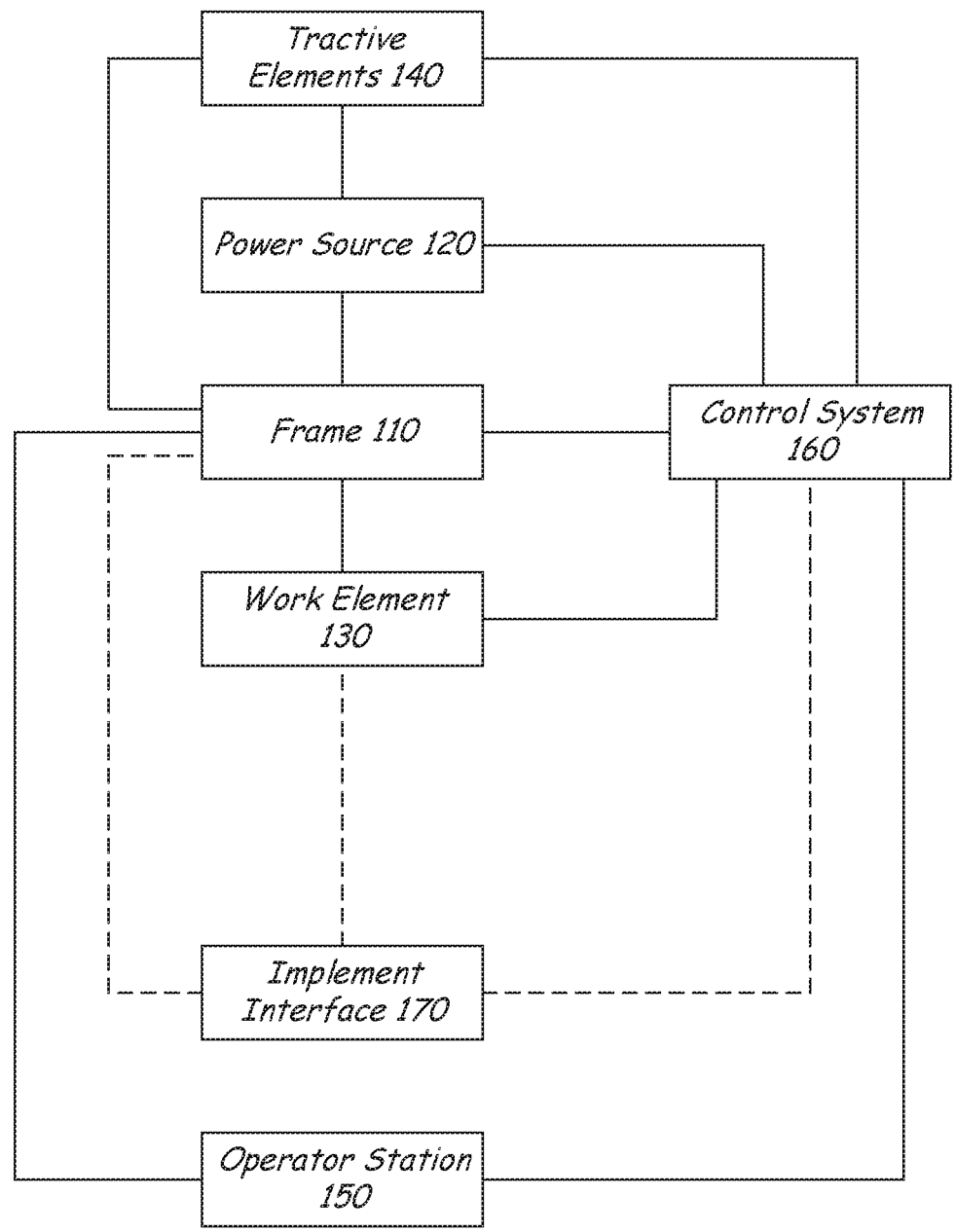
FIG. 1 is a block diagram illustrating functional systems of a representative power machine on which embodiments of the present disclosure can be advantageously practiced.

FIG. 1 illustrates a block diagram illustrates the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is capable of providing power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote control device can be provided (i.e. remote from both of the power machine and any implement to which is it coupled) that is capable of controlling at least some of the operator controlled functions on the power machine.

FIGS. 2-3 illustrates a loader 200, which is one particular example of a power machine of the type illustrated in FIG. 1 where the embodiments discussed below can be advantageously employed. Loader 200 is a track loader and more particularly, a compact tracked loader. A track loader is a loader that has endless tracks as tractive elements (as opposed to wheels). Track loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Track loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the track loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Frame 210 also supports a work element in the form of a lift arm structure 230 that is powered by the power system 220 and is capable of performing various work tasks. As loader 200 is a work vehicle, frame 210 also supports a traction system 240, which is also powered by power system 220 and is capable of propelling the power machine over a support surface. The lift arm structure 230 in turn supports an implement carrier interface 270, which includes an implement carrier 272 that is capable of receiving and securing various implements to the loader 200 for performing various work tasks and power couplers 274, which are provided to selective provide power to an implement that might be connected to the loader. The loader 200 can be operated from within a cab 250 from which an operator can manipulate various control devices 260 to cause the power machine to perform various functions. Cab 250 can be pivoted back about an axis that extends through mounts 254 to access components as needed for maintenance and repair.

Various power machines that are capable of including and/or interacting with the embodiments discussed below can have various different frame components that support various work elements. The elements of frame 210 discussed herein are provided for illustrative purposes and should not be considered to be the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200 is attached to the undercarriage 211 such as with fasteners or by welding the undercarriage to the mainframe. Mainframe 212 includes a pair of upright portions 214A and 214B located on either side and toward the rear of the mainframe that support lift arm structure 230 and to which the lift arm structure 230 is pivotally attached. The lift arm structure 230 is illustratively pinned to each of the upright portions 214A and 214B. The combination of mounting features on the upright portions 214A and 214B and the lift arm structure 230 and mounting hardware (including pins used to pin the lift arm structure to the mainframe 212) are collectively referred to as joints 216A and 216B (one is located on each of the upright portions 214) for the purposes of this discussion. Joints 216A and 216B are aligned along an axis 218 so that the lift arm structure is capable of pivoting, as discussed below, with respect to the frame 210 about axis 218. Other power machines may not include upright portions on either side of the frame, or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements 219A and 219B on either side of the loader 200, which on loader 200 are track assemblies.

The lift arm structure 230 shown in FIG. 1 is one example of many different types of lift arm structures that can be attached to a power machine such as loader 200 or other power machines on which embodiments of the present discussion can be practiced. The lift arm structure 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. The lift arm structure 230 is moveable (i.e. the lift arm structure can be raised and lowered) under control of the loader 200 with respect to the frame 210. That movement (i.e. the raising and lowering of the lift arm structure 230) is described by a travel path, shown generally by arrow 237. For the purposes of this discussion, the travel path 237 of the lift arm structure 230 is defined by the path of movement of the second end 232B of the lift arm structure.

Each of the lift arms 234 of lift arm structure 230 as shown in FIG. 2 includes a first portion 234A and a second portion 234B that is pivotally coupled to the first portion 234A. The first portion 234A of each lift arm 234 is pivotally coupled to the frame 210 at one of the joints 216 and the second portion 234B extends from its connection to the first portion 234A to the second end 232B of the lift arm structure 230. The lift arms 234 are each coupled to a cross member 236 that is attached to the first portions 234A. Cross member 236 provides increased structural stability to the lift arm structure 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm structure 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed travel path of the lift arm structure 230. The lift arm structure 230 shown in FIG. 2 is representative of one type of lift arm structure that may be coupled to the power machine 100. Other lift arm structures, with different geometries, components, and arrangements can be pivotally coupled to the loader 200 or other power machines upon which the embodiments discussed herein can be practiced without departing from the scope of the present discussion. For example, other machines can have lift arm structures with lift arms that each has one portion (as opposed to the two portions 234A and 234B of lift arm 234) that is pivotally coupled to a frame at one end with the other end being positioned in front of the frame. Other lift arm structures can have an extendable or telescoping lift arm. Still other lift arm structures can have several (i.e. more than two) portions segments or portions. Some lift arms, most notably lift arms on excavators but also possible on loaders, may have portions that are controllable to pivot with respect to another segment instead of moving in concert (i.e. along a pre-determined path) as is the case in the lift arm structure 230 shown in FIG. 2. Some power machines have lift arm structures with a single lift arm, such as is known in excavators or even some loaders and other power machines. Other power machines can have a plurality of lift arm structures, each being independent of the other(s).

An exemplary implement interface 270 is provided at a second end 234B of the arm 234. The implement interface 270 includes an implement carrier 272 that is capable of accepting and securing a variety of different implements to the lift arm 230. Such implements have a machine interface that is configured to be engaged with the implement carrier 272. The implement carrier 272 is pivotally mounted to the second end 234B of the arm 234. Implement carrier actuators are operably coupled the lift arm structure 230 and the implement carrier 272 and are operable to rotate the implement carrier with respect to the lift arm structure.

The implement interface 270 also includes an implement power source 274 available for connection to an implement on the lift arm structure 230. The implement power source 274 includes pressurized hydraulic fluid port to which an implement can be coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

The lower frame 211 supports and has attached to it a pair of tractive elements 219A and 219B. Each of the tractive elements 219A and 219B has a track frame that is coupled to the lower frame 211. The track frame supports and is surrounded by an endless track, which rotates under power to propel the loader 200 over a support surface. Various elements are coupled to or otherwise supported by the track frame for engaging and supporting the endless track and cause it to rotate about the track frame. For example, a sprocket is supported by the track frame and engages the endless track to cause the endless track to rotate about the track frame. An idler is held against the track by a tensioner (not shown) to maintain proper tension on the track. The track frame also supports a plurality of rollers, which engage the track and, through the track, the support surface to support and distribute the weight of the loader 200.

Display devices are provided in the cab to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 4:
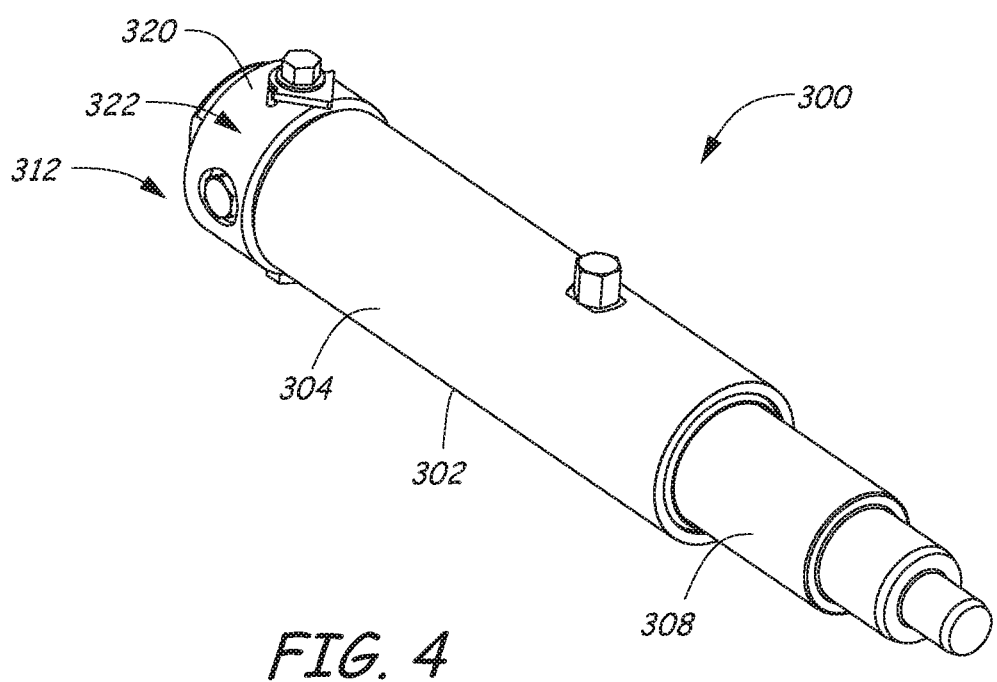
FIG. 4 is a perspective view of a tensioning element for use to tension a track on a power machine of the type shown in FIGS. 2-3 according to one illustrative embodiment.
Figure 9:
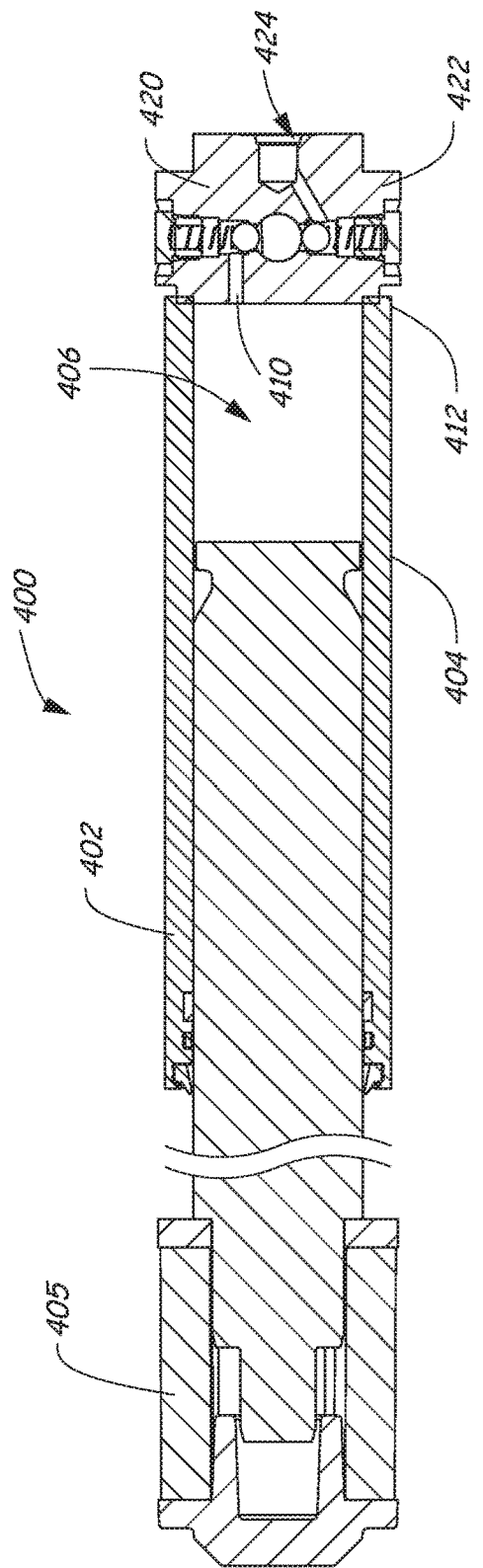
FIG. 9 is a cross-sectional view of the tensioning element of FIGS. 7-8.

FIG. 4 illustrates a tensioning element 300 according to one illustrative embodiment of the type that can provide maintain proper tension on a track such as track 244 described in FIGS. 2-3 above. FIGS. 5-6 provide cross-sectional views of the tensioning element 300. The tensioning element 300 includes a cylinder 302 that is moveable to apply tension to an idler such as 245 that in turn applies tension to an endless track such as track 244. The cylinder 302 includes a body 304 with a cavity 306 in which a piston 308 can move and be moved via the introduction of a pressurized fluid into the cavity.

The tensioning element 300 also includes a valve assembly 320 is coupled to the cylinder 302 to regulate the flow of pressurized fluid into and out of the cavity 306. The valve assembly 320 has a body 322 that is coupled to the base end 312 of the cylinder 302. A valve element 332 is positioned within a central cavity 335 of the body 322 of the valve assembly 320. The valve element 332 is moveable from a first position (shown in FIG. 5) in which hydraulic fluid is allowed into the cavity 306 and a second position (shown in FIG. 6) in which hydraulic fluid is allowed out of the cavity 306. A path 330 within the valve assembly body 322 includes a pair of passages: a port side passage 324 and a cylinder side passage 326 on either side of the central cavity 335. The port side passage 324 provides a path from the port 328 to the central cavity 335 of the valve assembly body 322. The cylinder side passage 326 provides a path from the cavity 306 (passage 326) to the central cavity 335. The port side passage 324 is capable of accepting a fitting (not shown) inserted therein. Such a fitting can allow for ease of connection with a source of pressurized fluid (not shown) for adding pressurized fluid into the cavity 306. Any suitable fitting can be used. In some embodiments, a valve assembly may not include a fitting. In other embodiments, the fitting may be integrated into the valve assembly body. The cylinder side passage 326 is in communication with aperture 310.

A valve element 332 is positioned in a cavity in the valve assembly body 322 so that a portion of the path 330 extends through the valve element 332. A check ball 336 is positioned in the path 330 and biased into a position to block the flow of pressurized fluid through the path 330 by a biasing element 338 in the form of a spring. When the check ball 336 is in the biased position, the path 330 is blocked so that hydraulic fluid cannot pass into or out of the cavity 306. For the purposes of this discussion, a portion of path 330 that extends through the valve element 322 is identified as path 340. Path 340 is further divided into a first portion 342 and a second portion 344. The first portion 344 extends from a surface of the valve element 332 to a position on a back or spring side of the check ball 336 when the check ball is located in its biased position. The second portion 342 of the path 340 extends from a surface of the valve element 332 to a front or opposing side of the check ball 336 from the first portion 342 of the path 340. In this configuration, pressure present in the first portion 344 of the path 340 will tend to urge the check ball 336 into its seated or blocked position, thereby preventing the flow of pressurized fluid into or out of the cavity 306. Conversely, pressure present in the second portion 342 of the path 340 will tend to urge the check ball 336 away from its biased position and allow flow into the cavity 306. Thus, flow can only occur from the section portion 342 to the first portion 344.

The valve element 332 is movable between a first position, as shown in FIG. 5 and a second position as shown in FIG. 6. In the first position, the valve element 332 is oriented such that pressurized fluid can only be introduced into the cavity 306. In this position, the tensioning element 300 maintains constant pressure on an idler unless additional pressurized fluid is being introduced into the cavity 306. In other words, the first position is the default running position. In the second position, pressurized fluid from inside the cavity 306 is able to overcome the check ball 336 and be drained out of the cavity 306. The second position, then, is operable to drain pressurized fluid from the cavity 306 and relieve the tension applied by the tensioning element 300. Stated another way, when the valve element 332 is in the first position, the check valve 336 is positioned within the path 340 to allow flow from the inlet (or stated another way, a first port) 324 to the outlet (or second port) 326 and block flow in the opposite direction. Conversely, when the valve element 332 is in the second position, the check valve 336 is positioned to allow flow from the second port 326 to the first port 324 and block flow in the opposite direction. The valve element 332 is rotatable between the first position and the second position. A handle 346 is advantageously provided to rotate the valve element 332 between the first position and the second position. In some embodiments, other types of structures may be provided that are suitable for rotating between the first and second positions. The check valve 336 remains in the same linear orientation with respect to the cylinder body 304 regardless of whether the valve element 332 is in the first position or in the second position.

FIGS. 7-11 illustrate a tensioning element 400 according to another illustrative embodiment. As in previous embodiments, the tensioning element 400 includes a cylinder 402 that is movable to apply tension to an idler that in turn applies tension to an endless track. The cylinder 402 includes a body 404 with a cavity 406 in which a piston 407 can be moved via the introduction of a pressurized fluid into the cavity. An aperture 410 provides a path through which pressurized fluid can enter or exit the cavity 906.

Similar to valve assembly 320 described above, a valve assembly 420 is provided to regulate the flow of pressurized fluid into and out of the cavity 406. The valve assembly 420 has a body 422 that is coupled to the base end 412 of the cylinder 402. The valve assembly body 422 has a port 424 which provides both an inlet and an outlet for pressurized fluid entering and exiting cavity 406. Although not shown, in some embodiments port 424 can include a fitting secured therein or integrated with the valve assembly 420. While both of port 424 and aperture 410 serve as inlets and outlets as described below in greater detail, for discussion purposes port 424 is sometimes referred to herein as the valve assembly body inlet, while aperture 410 is sometimes referred to herein as the valve assembly body outlet.

In this illustrated embodiment, valve assembly 420 includes a first one-way valve 434 positioned in valve passage 435, and a second one-way valve 436 positioned in valve passage 437. In the illustrated embodiment, the first and second one-way valves 434 and 436 are ball-style check valves, respectively with a ball 438, 440 biased by a spring 442, 444 to prevent flow of pressurized fluid through the passages 435, 437 under various conditions. However, in other embodiments, one-way valves 434 and 436 can be poppet-style check valves instead of ball-style valves. Generally, poppet or ball style seatable members 438, 440 can be used. Ball 438 and spring 442 of first one-way valve 434 are inserted into valve passage 435 and then plug 439 is attached to body 422 to maintain the components of the first one-way valve within valve passage 435. Similarly, ball 440 and spring 444 are inserted into valve passage 437, and then plug 429 is attached to body 422 to maintain the components of the second one-way valve within valve passage 437.

Valve assembly 420 also includes a valve control mechanism 450, configured to selectively control valves 434 and 436 to allow or prevent flow of the pressurized fluid either into or out of cavity 406. For example, valve control mechanism 450 can be a rotatable valve control mechanism having a mechanism 452 positioned on an outside of the valve assembly body 422, and a valve engagement mechanism 454 extending into an aperture 455 of the valve assembly body 422 and coupled or connected to mechanism 452 such that valve engagement mechanism 454 is rotated by rotation of mechanism 452. A stop mechanism or member 453, such as a peg, can be included with valve control mechanism 450 to engage features 449 and 451 and thereby stop rotation of the mechanism 452 and valve control mechanism in first and second positions. In the first position, shown in FIG. 8, mechanism 452 has been rotated until stop member 453 engages feature 451. In this position, pressurized hydraulic fluid can enter port 424 and be provided into cavity 406 as described below. In the second position, pressurized hydraulic fluid can exit cavity 406 through aperture 410 as described below. In some exemplary embodiments, mechanism 452 includes an arrow shaped portion which points in the direction of allowed hydraulic fluid flow into or out of the cavity.

Figure 10:
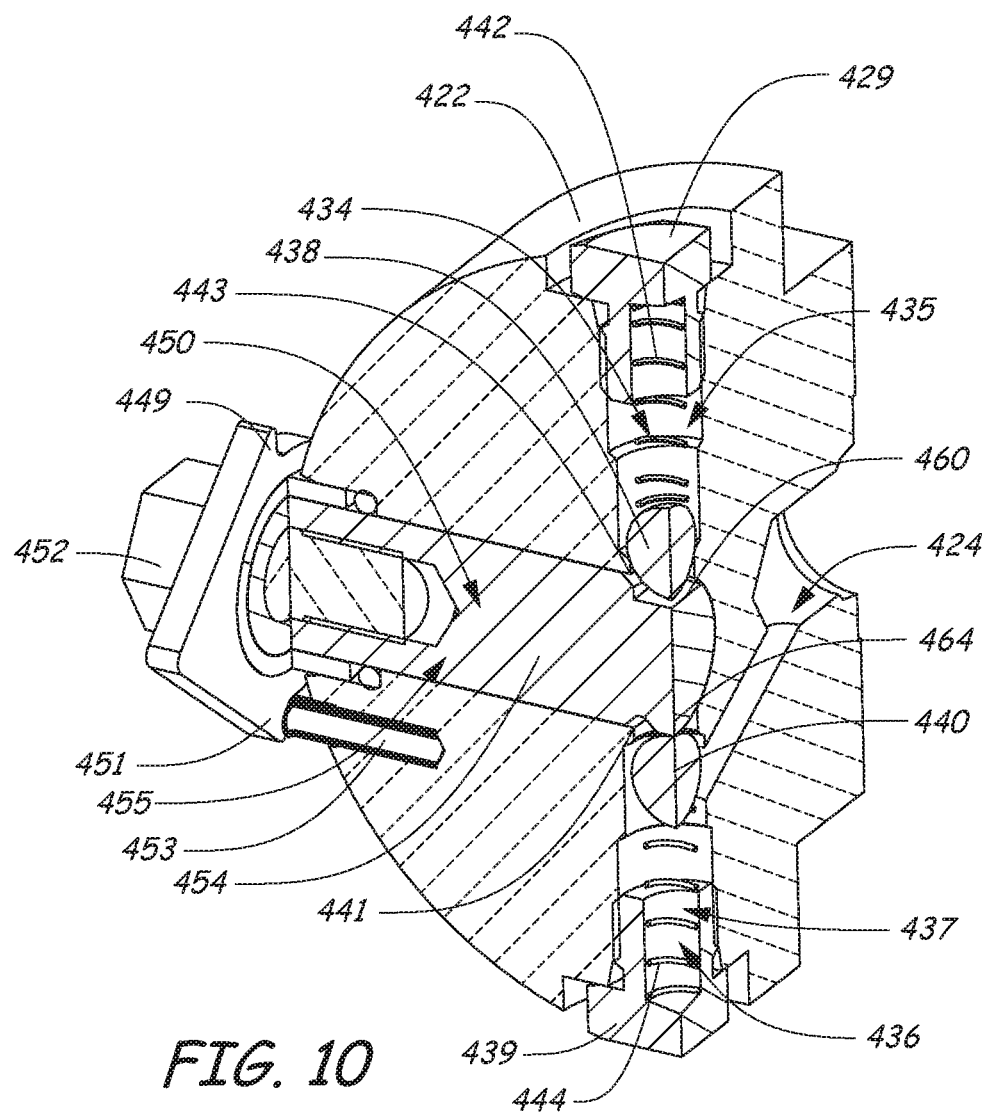
FIGS. 10-11 are cross-sectional views of a portion of the valve assembly of then tensioning element of FIGS. 7-8.
Figure 11:
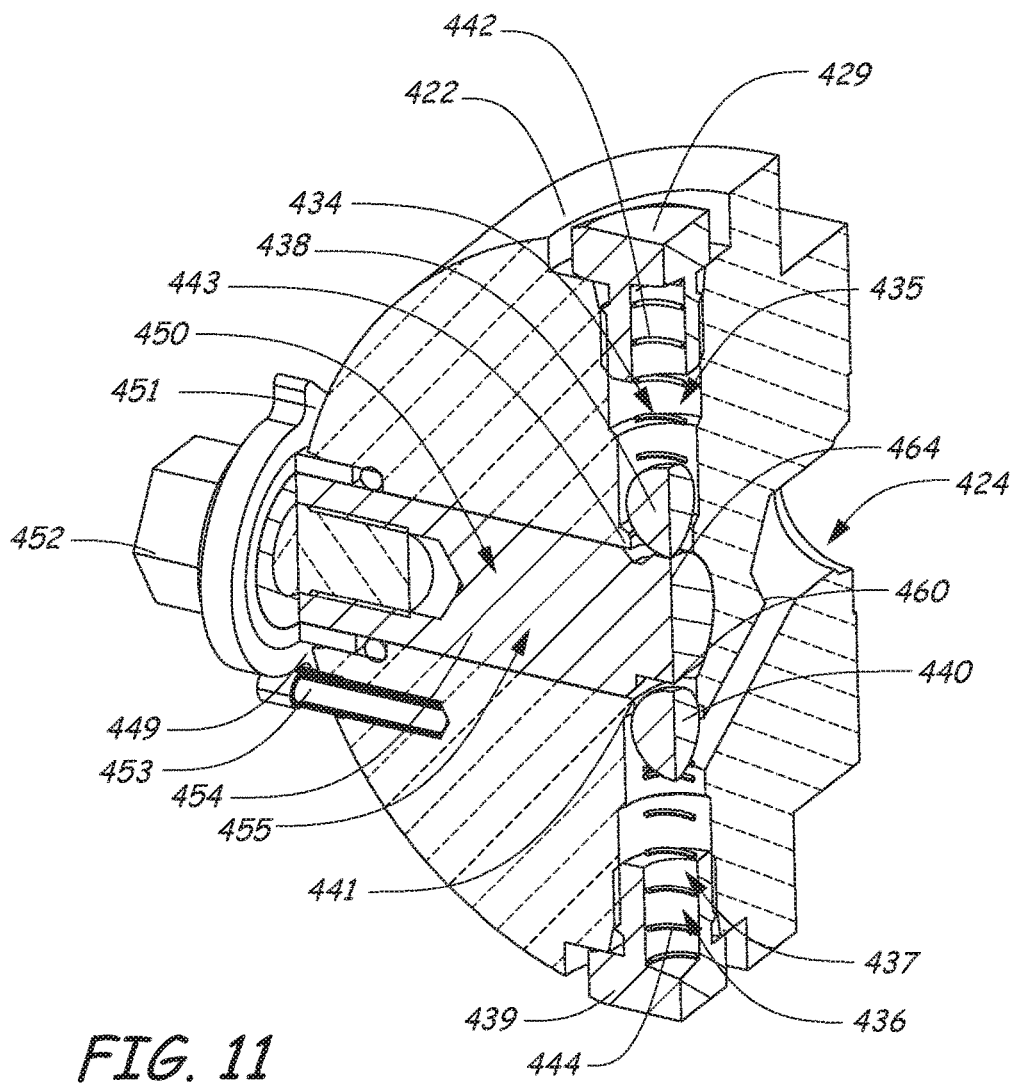

In the embodiment illustrated in FIGS. 10 and 11, Valve engagement mechanism 454 has a substantially flat or straight side or portion 460 and a rounded portion 464, though other shapes can be used as well. For example, portion 460 need not be straight in all embodiments. In the illustrated embodiment, rounded portion 464 of valve engagement mechanism 454 is positioned closer to the walls of aperture 455 than is straight portion 460, such that depending on which of the two rotational positions (shown in FIGS. 10 and 11) mechanism 452 and valve engagement mechanism 454 are in, only one of balls 438 and 440 are engaged by rounded portion 464 in either position. The other ball is then free to move under spring bias at least partially against the respective seating surfaces 443 and 441 within passages 435 and 437, thereby allowing sealing of the respective passageways 435, 437.

The embodiments above provide several advantages. By having a valve element of the type disclosed herein operably coupled to a tensioning element such as a cylinder, a single port is accessible from outside of the cylinder to apply or relieve tension from the tensioning element, reducing the complexity of hydraulic circuitry necessary for the tensioning function.

Referring now to FIG. 12-17, shown is a diagrammatic illustration of portions of a track tensioning element 500 that include piston retaining features which retain a piston (shown generally at 505) within a cylinder tube 510 of the tensioning element. In other embodiments, element 500 is employed for retaining a piston within a tube in applications other than track tensioning. Track tensioning element 500 is shown without a valve element of the type described above, but it should be understood that any suitable valve element can be employed to port fluid in and out of the cylinder tube 510.

First piston retaining features 515 are attached or otherwise coupled to cylinder tube 510. FIG. 13 is a diagrammatic illustration of a portion of element 500 shown in FIG. 12 and showing in greater detail the first piston retaining features 515. In some exemplary embodiments, first piston retaining features 515 include an enclosure 520 attached to the cylinder tube 510. Adjacent to or under enclosure 520, a passage 525 is drilled or otherwise formed into the bore of cylinder tube 510. The passage 525 can be formed prior to coupling enclosure 520 to the cylinder tube 510. A stop device 530, such as a pin or ball, is inserted into, or is otherwise positioned within, the enclosure 520 and energized or biased with a spring 535 or other spring type device away from the enclosure and toward the piston 505.

Figure 12:
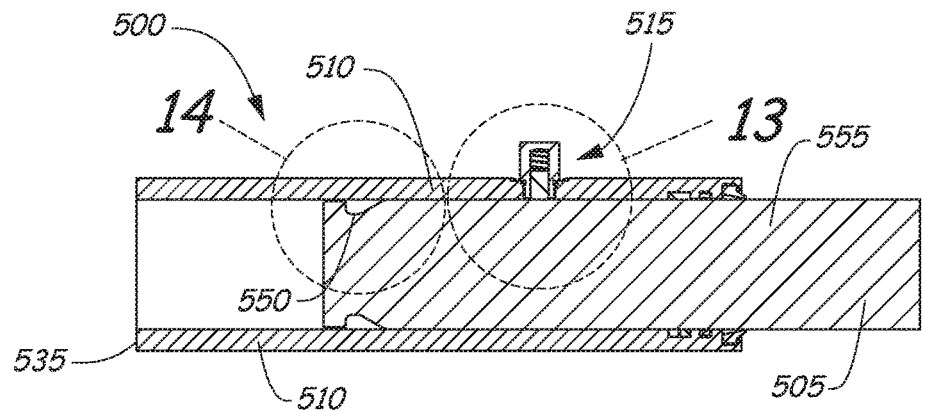
FIG. 12 is a diagrammatic illustration of tensioning element features, in accordance with some illustrative embodiments, which utilize a stop device in a cylinder port and a mating groove in a piston shaft, to retain a piston within the cylinder tube.
Figure 13:
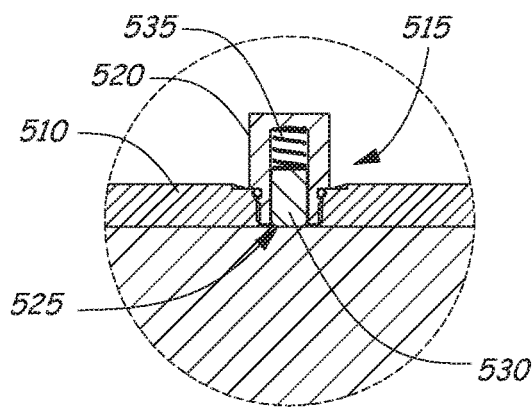
FIG. 13 is a diagrammatic illustration showing in greater detail the stop device and cylinder port of the cylinder tube as illustrated in FIG. 12.
Figure 14:
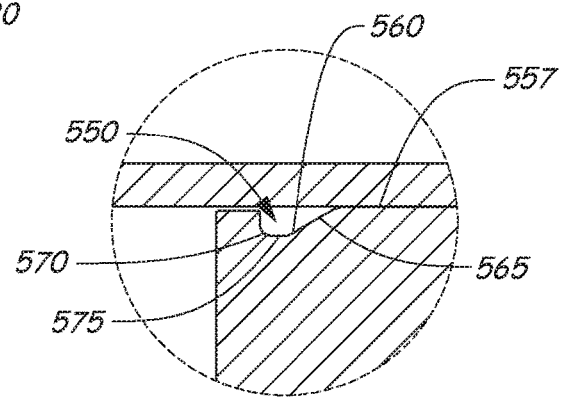
FIG. 14 is a diagrammatic illustration showing in greater detail the mating groove formed in the piston shaft as illustrated in FIG. 12.

As shown in FIGS. 12 and 14, a second piston retaining feature 550 includes a mating groove 560 added to, or formed in, piston 505. Mating groove 560 is positioned on the piston 505 at a location corresponding to a maximum desired extended position of the piston within cylinder tube 510. When the piston 505 moves in the cylinder body 510 so that the groove 560 is in alignment with the spring loaded stop device 530, the stop device 530 engages the groove by extending into the groove as a result of the biasing force applied by spring 535 to prevent the shaft 555 from extending any further.

In exemplary embodiments, the mating groove 560 includes a tapered entry surface 565 extending between an outer surface 557 of shaft 555 and a fully recessed portion 575 of groove 560. A stop surface 570, which in exemplary embodiments is a non-tapered surface extending between the outer surface 557 of shaft 555 and the fully recessed portion 575 of groove 560, is positioned to stop further extension of the piston shaft 555 from cylinder tube 510. Other stop surface configurations are also contemplated. For example, in other embodiments, fully recessed portion 575 is substantially only a point and tapered entry surface 565 ends at stop surface 570.

Figure 15:
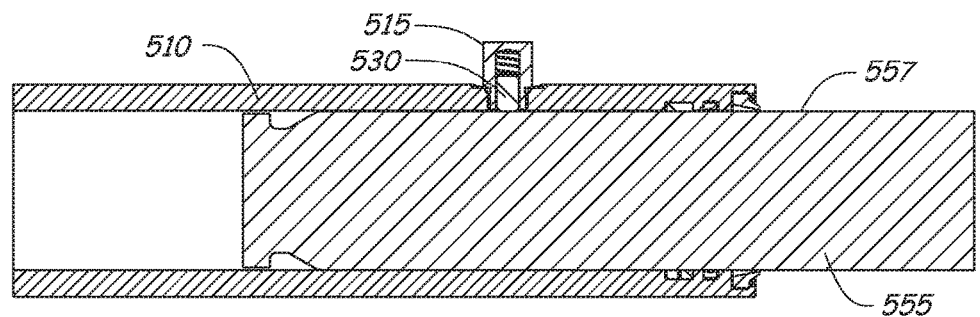
FIGS. 15-17 are diagrammatic illustrations showing the tensioning element features of FIG. 12 in various positions relative to the piston shaft.
Figure 16:
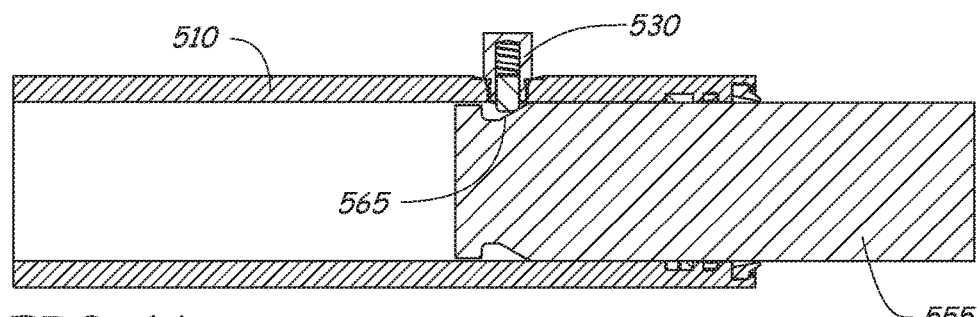
Figure 17:
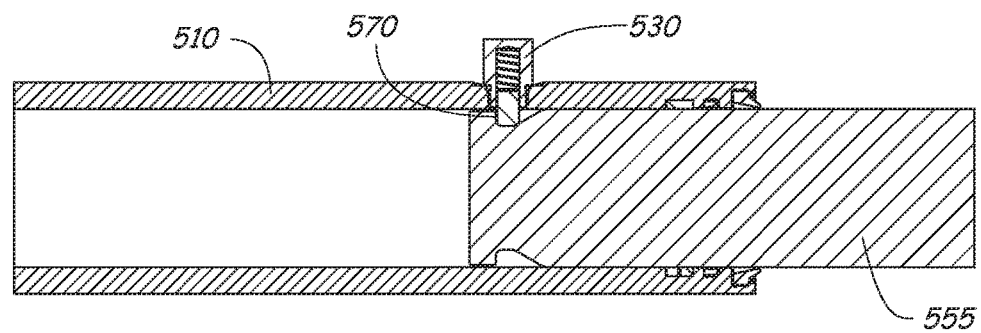

Tapered surface 565 allows piston shaft 555 to be extended to a maximum allowed position of the piston within cylinder tube 510, while also facilitating automatic retraction of stop device 530, such as a locking pin, as the piston shaft moves toward a position of further retraction within the cylinder tube 510. FIGS. 15 through 17 are diagrammatic illustrations showing the tensioning element features of FIGS. 12-14 in various positions of the piston shaft. In FIG. 15, with piston shaft 455 retracted well with the cylinder tube 510, spring loaded stop device 530 is biased into contact with a surface 557 of shaft 555, but does not stop movement of the piston in either direction.

Next, as shown in FIG. 16, once shaft 555 has been extended to a point near the maximum desired extended position within cylinder tube 510, spring loaded stop device 530 is biased into contact with tapered entry surface 565. As shaft 555 is further extended, stop device 530 eventually comes into contact with fully recessed portion 575 and stop surface 570, preventing further extension of the piston. This is shown in FIG. 17. As piston rod 555 is again retracted into cylinder tube 510, stop device 530 is pushed up tapered surface 565 as shown in FIG. 16, and eventually makes contact with surface 557 of shaft 555 as shown in FIG. 15. Thus, the disclosed piston retaining features retain the piston within the cylinder tube at a maximum position to prevent the piston from completely exiting the cylinder tube, while allowing normal operation of the cylinder for tensioning or other purposes.

Figure 18:
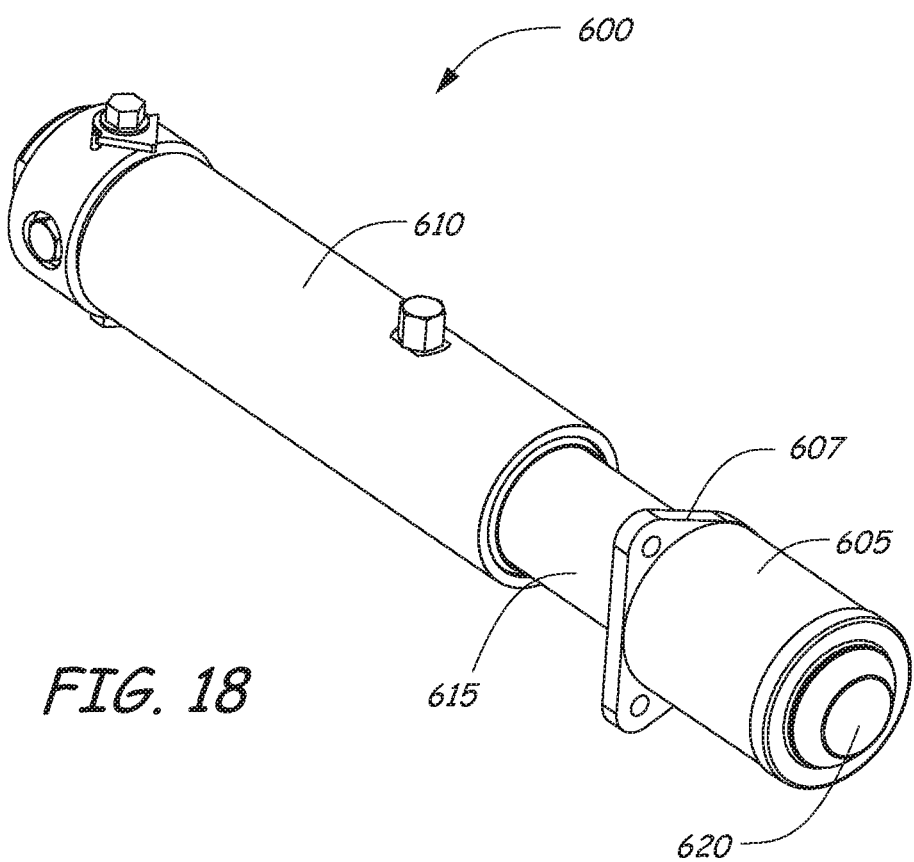
FIG. 18 illustrates a tensioning element having a spring element attached thereto according to yet another illustrative embodiment.
Figure 19:
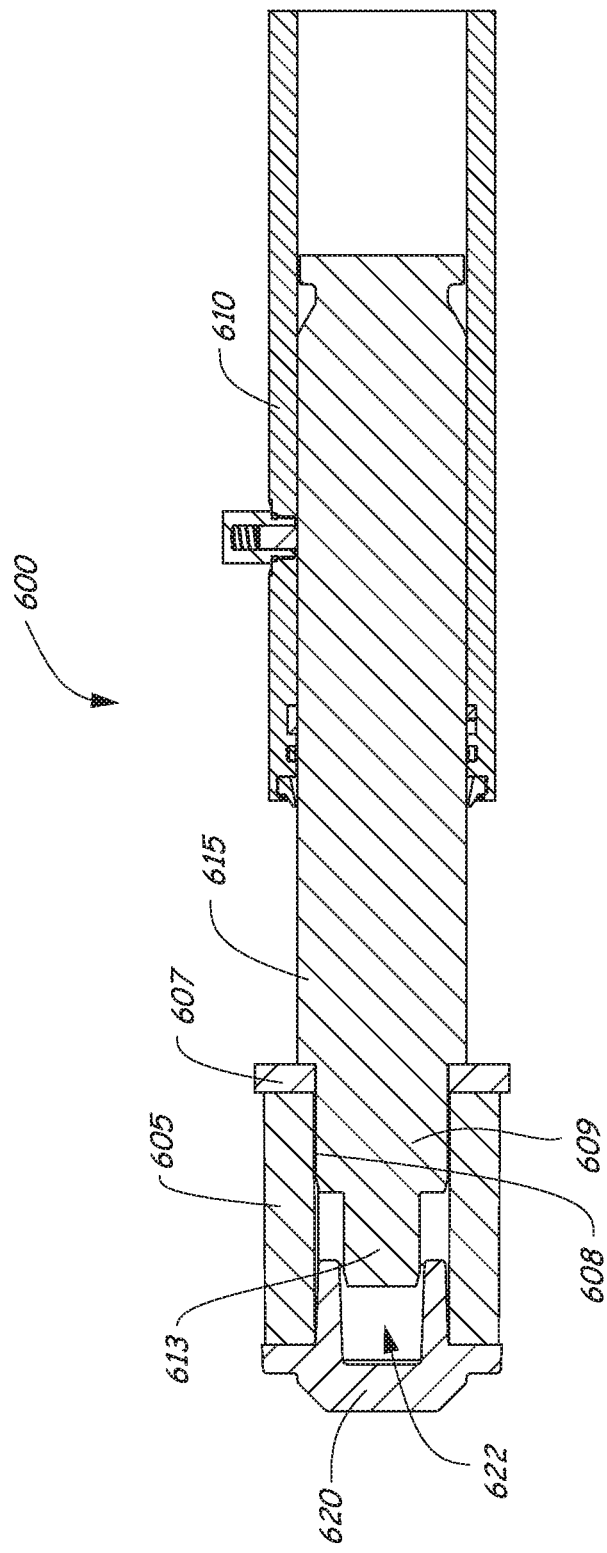
FIG. 19 illustrates a cross section of the tensioning element of FIG. 18.

Referring now to FIGS. 18-19, shown is a diagrammatic illustration of portions of a track tensioning element 600 which include a no-preload spring 605 positioned in-line with a tensioning cylinder 610 having a corresponding piston 615. Most conventional track tensioners for compact track equipment contain an assembly including of an extension cylinder, commonly activated by the addition of a fluid to extend the cylinder shaft, and a steel recoil spring to allow the track tension system to compress a given distance under high loads, caused by impacts or debris trapped in the carriage components, and not cause damage to the track or track system. Such steel recoil springs are limited by package size, spring rate, and material characteristics requiring them to be preloaded to some value above the catenary force of the track and also to be unaffected by machine motor torque.

Spring 605, positioned in-line with tensioning cylinder 610, is in exemplary embodiments a spring made out of a solid, compressible material, such as a polymer or other suitable material. Such springs have the ability to generate high spring rates similar to a steel coil spring in a compact package, but typically don't function well if the static pre-load forces are high enough to deflect the material above its material stress limits. This characteristic frequently makes replacing a steel coil spring with a polymer spring of similar spring rate and preload difficult. A transition plate 607 is placed on the piston 615 to provide a seating surface for the spring 605. The piston has a pair of narrowed portions 609 and 613. The narrowed portion 609 corresponds generally to an interior surface 608 of the spring 605 so that the spring is carried inline with the piston. A push plate 620 serves as an end cap of the spring and a surface capable of engaging an idler assembly (not shown) to push the idler assembly against an endless track to tension the track. The push plate has an interior cavity 622 formed therein for receiving the second narrowed portion 613 of the piston. This serves to maintain alignment of the spring 605 and limit the overall compression of the spring.

In accordance with disclosed embodiments, a track tension recoil system overcomes conventional difficulties by employing a spring 605 with such a spring rate that preloading the assembly is not required. Such a recoil spring system has no preload force in the free-state, an initial static load equal to the catenary force of the track tension, and a recoil force similar to a steel spring system of conventional power machines of similar size.

Disclosed non-preload tensioner systems are designed around solid, compressible springs having dynamic spring rates such that the speed and frequency of loads generated by compact track equipment are reacted to in such a way to absorb the energy at variable rates. A low force, high frequency load is absorbed at a very high dynamic spring rate resulting in minimal deflection of the spring 605. These would be typical loads generated by normal operation of the compact equipment. High force, low frequency loads are introduced at a much lower rate, decreasing the dynamic spring rate of the spring, and resulting in high deflection of the spring. These would be typical loads generated from such things as debris trapped in the carriage system. The spring 605 is designed such that the resultant force allows debris to travel through the carriage without damage, while not allowing enough deflection to cause de-tracking. This maximum force and deflection is similar to the maximum force and deflection of a conventional steel coil spring design. A non-preloaded coil spring would have excessive recoil movement under normal operation, causing an excessive wear condition. However, the non-preload spring 605 does not suffer from this excessive recoil movement, and therefore provides an advantageous track tensioning element 600 and corresponding system.

Although the present invention has been described with reference to preferred embodiments, workers skilled in the art will recognize that changes may be made in form and detail without departing from the spirit and scope of the invention.

What is claimed is:

1. A system for introducing and evacuating fluid from a cavity through a single port, the system comprising:
  a valve assembly comprising:
    a valve assembly body having an inlet providing the single port and an outlet, the outlet positioned in fluid communication with an aperture into the cavity;
    a fluid path extending through the valve body between the inlet and the outlet;
    a valve element positioned in the valve assembly body, the valve element configured to be rotated between a first position and a second position, the valve element including a check ball mechanism further configured such that in the first position pressurized fluid can be introduced from the inlet, through the fluid path and outlet, into the cavity, and the check ball mechanism is positioned such that pressurized fluid in the cavity is prevented from exiting through the outlet, the valve element further configured such that in the second position pressurized fluid in the cavity can pass through the outlet and the fluid path and exit the inlet, but not be introduced from the inlet.

2. The system of claim 1, wherein the valve element comprises a single check valve having a single check ball and a biasing element biasing the single check ball toward a seated position, wherein the valve element is configured such that when the valve element is in the first position, pressure from pressurized fluid in the cavity urges the single check ball toward the seated position and thereby prevents the pressurized fluid in the cavity from exiting the cavity through the outlet, and such that pressure from pressurized fluid introduced at the inlet urges the single check ball away from the seated position and thereby allows the pressurized fluid from the inlet to be introduced into the cavity through the fluid path and the outlet, and wherein the valve element is configured such that when the valve element is in the second position, pressure from pressurized fluid in the cavity urges the single check ball away from the seated position and thereby allows the pressurized fluid in the cavity to exit through the outlet, the fluid path and the inlet.

3. The system of claim 1, and further comprising a mechanism coupled to the valve element and moveable to rotate the valve element between the first position and the second position.

4. A tensioning cylinder having a cylinder body providing the cavity and including the system of claim 1.

5. An actuator comprising:
a cylinder;
a piston positioned within the cylinder; and
a piston retaining mechanism coupled to the cylinder and configured to interact with the piston to retain the piston within the cylinder, the piston retaining mechanism comprising:
an enclosure attached to a wall of the cylinder adjacent to a passage formed in the cylinder wall;
a stop device positioned within the enclosure and extending into the passage;
a spring positioned within the enclosure and biasing the stop device toward the piston; and
a piston retaining feature coupled to the piston and configured to interact with the stop device to prevent the piston from completely exiting the cylinder.

6. The actuator of claim 5, wherein the stop device comprises a pin.

7. The actuator of claim 5, wherein the piston retaining feature coupled to the piston comprises a mating groove, and wherein the stop device is configured to be biased into the mating groove to prevent the piston from exiting the cylinder.

8. The actuator of claim 7, wherein the mating groove is formed in the piston.

9. The actuator of claim 7, wherein the mating groove includes a tapered surface and a stop surface, the stop surface positioned and configured to engage the stop device to prevent extension of the piston beyond a maximum extended position.

10. The actuator of claim 9, wherein the tapered surface is positioned and configured to engage the stop device during retraction of the piston from the maxim extended position to push the stop device toward contact with a piston surface that does not stop movement of the piston during either retraction or extension.

11. A tensioning system including the actuator of claim 5.

12. A system for introducing and evacuating fluid from a cavity through a single port, the system comprising:
a valve assembly comprising:
a valve assembly body having an inlet providing the single port and an outlet, the outlet positioned in fluid communication with the cavity;
a first one-way valve positioned in a first valve passage forming a first portion of a fluid path through the valve assembly body between the inlet and the outlet, the first one-way valve biased toward a closed position;
a second one-way valve positioned in a second valve passage forming a second portion of the fluid path through the valve assembly body between the inlet and the outlet, the second one-way valve biased toward a closed position; and
a valve control mechanism positioned between the first and second one-way valves and operable to selectively control the first and second one-way valves to selectively allow and prevent flow of pressurized fluid into and out of the cavity.

13. The system of claim 12, wherein the valve control mechanism is configured to be selectively moved between first and second positions, wherein in the first position the first one-way valve is maintained in its open position and the second one-way valve is biased toward its closed position such that pressurized fluid introduced from the inlet and flowing through the first one-way valve can open the second one-way valve and flow through the outlet into the cavity, but pressurized fluid in the cavity is prevented from exiting through the outlet.

14. The system of claim 13, wherein the valve control mechanism is configured such that in the second position the second one-way valve is maintained in its open position and the first one-way valve is biased toward its closed position such that pressurized fluid in the cavity and flowing through the second one-way valve can open the first one-way valve and flow through the inlet.

15. The system of claim 14, wherein the valve control mechanism is configured to be manipulated by a user to be moved between the first and second positions.

16. The system of claim 14, wherein the first one-way valve comprises a first seatable member and a first spring, and wherein the second one-way valve comprises a second seatable member and a second spring.

17. The system of claim 14, wherein the valve control mechanism includes a rotatable valve engagement mechanism having a first portion and a second port, wherein in the first position the first portion is positioned to engage the first seatable member to maintain the first one-way valve in its open position and the second portion is positioned adjacent the second seatable member to allow the second one-way valve to close, and wherein in the second position the first portion is positioned to engage the second seatable member to maintain the second one-way valve in its open position and the second portion is positioned adjacent the first seatable member to allow the second one-way valve to close.

* * * * *